United States Patent
Bornard et al.

(10) Patent No.: US 10,138,863 B2
(45) Date of Patent: Nov. 27, 2018

(54) METHOD FOR MANUFACTURING A ROTATING PART OF A HYDRAULIC MACHINE, ROTATING PART MANUFACTURED ACCORDING TO THIS METHOD, HYDRAULIC MACHINE AND ENERGY CONVERSION INSTALLATION

(71) Applicant: ALSTOM Renewable Technologies, Grenoble (FR)

(72) Inventors: Laurent Bornard, Saint-Ours (CA); Michel Sabourin, Sorel-Tracy (CA)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 310 days.

(21) Appl. No.: 14/952,162

(22) Filed: Nov. 25, 2015

(65) Prior Publication Data

US 2016/0084216 A1    Mar. 24, 2016

Related U.S. Application Data

(63) Continuation of application No. PCT/EP2014/060227, filed on May 19, 2014.

(30) Foreign Application Priority Data

May 27, 2013  (FR) ..................... 13 54772

(51) Int. Cl.
*F03B 3/12* (2006.01)
*F03B 3/02* (2006.01)
*F03B 3/04* (2006.01)

(52) U.S. Cl.
CPC ............... *F03B 3/123* (2013.01); *F03B 3/02* (2013.01); *F03B 3/04* (2013.01); *F03B 3/121* (2013.01);
(Continued)

(58) Field of Classification Search
CPC .... F03B 3/123; F03B 3/02; F03B 3/04; F03B 3/121; F03B 3/125; F03B 3/126;
(Continued)

(56) References Cited

U.S. PATENT DOCUMENTS

| 3,918,627 | A | 11/1975 | Kawano et al. |
| 4,780,051 | A | 10/1988 | Fisher, Jr. |

(Continued)

FOREIGN PATENT DOCUMENTS

| FR | 2 052 248 A5 | 4/1971 |
| JP | 35-016854 B | 11/1960 |

(Continued)

OTHER PUBLICATIONS

International Search Report (PCT/ISA/210) dated Sep. 18, 2014, by the European Patent Office as the International Searching Authority for International Application No. PCT/EP2014/060227.
(Continued)

*Primary Examiner* — David E Sosnowski
*Assistant Examiner* — Eric Zamora Alvarez
(74) *Attorney, Agent, or Firm* — Dority & Manning, P.A.

(57) ABSTRACT

A method is disclosed for manufacturing a rotating part which belongs to a hydraulic machine of an installation for converting hydraulic energy into electrical or mechanical energy. This rotating part includes blades distributed about an axis of rotation of the rotating part and extending from a leading edge to a trailing edge. This method can include manufacturing, in steel, a first part of each blade, which defines the leading edge thereof, manufacturing a second part of the blade in a material other than steel and attaching this to the first part of the blade so as to form a trailing edge.

12 Claims, 6 Drawing Sheets

(52) U.S. Cl.
CPC .............. *F03B 3/125* (2013.01); *F03B 3/126* (2013.01); *F03B 3/128* (2013.01); *F05B 2240/302* (2013.01); *Y02E 10/223* (2013.01); *Y02P 70/525* (2015.11)

(58) Field of Classification Search
CPC .. F03B 3/128; Y02P 70/525; F05B 2240/302; F05B 2240/303; F05B 2240/304; F01D 5/28; F01D 5/282; F01D 5/286; F01D 5/147
See application file for complete search history.

(56) References Cited

U.S. PATENT DOCUMENTS

| | | | | |
|---|---|---|---|---|
| 6,155,783 A | * | 12/2000 | Beyer | .......................... F03B 3/02 29/469.5 |
| 6,524,063 B1 | * | 2/2003 | Beyer | ..................... F01D 5/147 415/115 |
| 7,195,460 B2 | * | 3/2007 | Bazin | ...................... F03B 3/125 416/223 A |
| 2005/0271508 A1 | | 12/2005 | Beyene et al. | |

FOREIGN PATENT DOCUMENTS

| | | |
|---|---|---|
| JP | 50-007683 B1 | 3/1975 |
| JP | 58-148281 U | 10/1983 |
| RU | 1 708 035 C | 10/1996 |

OTHER PUBLICATIONS

Written Opinion (PCT/ISA/237) dated Sep. 18, 2014, by the European Patent Office as the International Searching Authority for International Application No. PCT/EP2014/060227.
French Search Report for FR 1354772 dated Mar. 3, 2014.
Office Action and Search issued in connection with corresponding RU Application No. 2015155715 dated Apr. 13, 2017.
JP Office Action, dated Mar. 27, 2018.

* cited by examiner

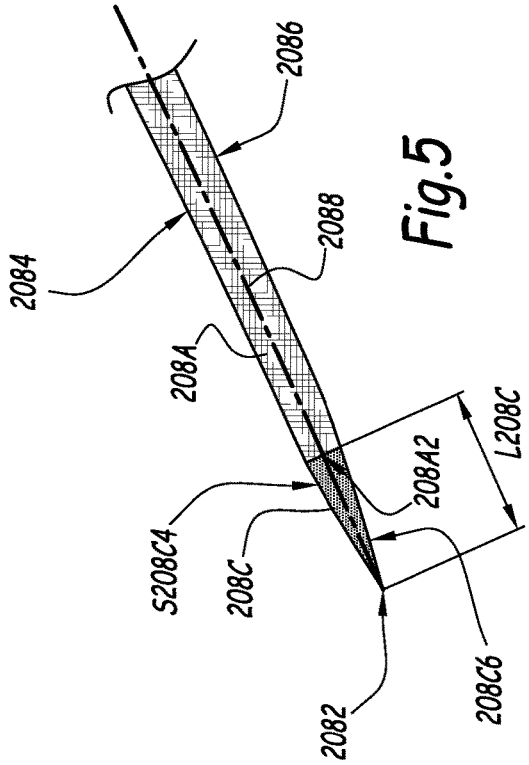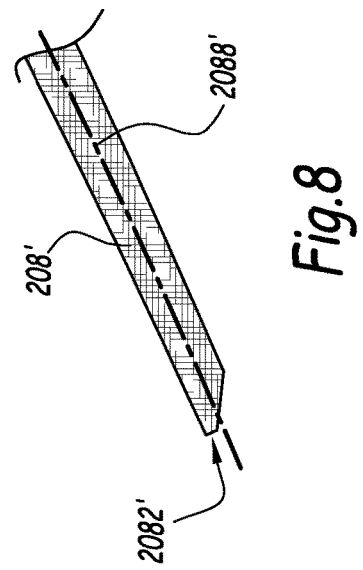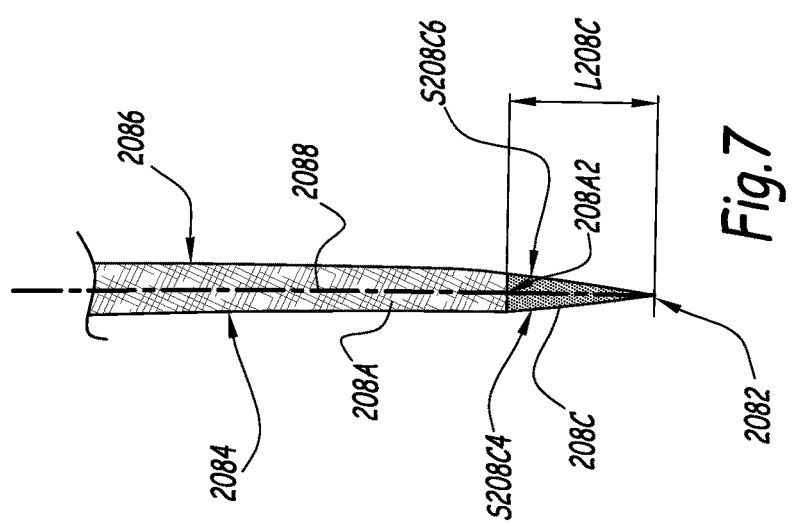

METHOD FOR MANUFACTURING A ROTATING PART OF A HYDRAULIC MACHINE, ROTATING PART MANUFACTURED ACCORDING TO THIS METHOD, HYDRAULIC MACHINE AND ENERGY CONVERSION INSTALLATION

RELATED APPLICATION(S)

This application claims priority as a continuation application under 35 U.S.C. § 120 to PCT/EP2014/060227 filed as an International Application on May 19, 2014 designating the U.S., and which claims priority to French Application 1354772 in France on May 27, 2013. The entire contents of these applications are hereby incorporated by reference in their entireties.

FIELD

This disclosure relates to a method for manufacturing the rotating part of a hydraulic machine belonging to an installation for converting hydraulic energy into mechanical or electrical energy, a rotating part manufactured in accordance with this method, a hydraulic machine equipped with such a rotating part and an energy conversion installation having such a machine.

BACKGROUND INFORMATION

In the field of converting hydraulic energy into mechanical or electrical energy, it is known to use a hydraulic machine such as a turbine, a pump or a pump-turbine. In turbine mode, the machine drives a shaft in rotation, thus transforming hydraulic energy into mechanical energy. This energy conversion is achieved by means of a runner having a runner crown, a runner band and blades which are distributed about the axis of rotation of the runner, between the runner crown and the runner band. The blades extend, following a curved line, between a first edge and a second edge which are respectively, in operation, a leading edge and a trailing edge for the flow of water. When operating in turbine mode, the water flows from an upstream water reservoir, through a penstock and arrives in a casing surrounding the runner of the machine. The casing then distributes the water between the blades of the runner. The blades have a specific profile by means of which regions of low pressure can be created inside the runner. This causes the runner to rotate. When the water reaches the trailing edge of the blades, it moves toward a downstream draft tube.

One of the current recurring issues in the field of hydraulic machines is the production of a Kármán vortex street close to and downstream of the trailing edges of the blades of the runner. More precisely, the trailing edges of the blades of the runner are not very streamlined and produce a periodic pattern of vortices caused by the unstable separation of the flow around the blades. The Kármán vortex streets reduce the efficiency of the machine and represent a dynamic load on the blades, which can lead to cracks.

The production of a Kármán vortex street is greater the thicker the trailing edge of the blade. A first solution is therefore to reduce as far as possible the thickness of the trailing edge in an asymmetric manner so as to disrupt the symmetry of the phenomenon, and the intensity thereof. This approach does make it possible to reduce the Kármán vortex streets, but cannot eliminate them as the properties of the steels used do not allow the necessary reduction in thickness.

SUMMARY

A method is disclosed for manufacturing a rotating part belonging to a hydraulic machine of an installation for converting hydraulic energy into electrical or mechanical energy, this rotating part having blades distributed about an axis of rotation of the rotating part and extending from a leading edge to a trailing edge, wherein the method comprises: manufacturing, in steel, a first part of each blade, which defines a leading edge thereof; and manufacturing a second part of the blade in a material other than steel and attaching this to the first part of the blade so as to form a trailing edge.

A rotating part configured for a hydraulic machine of an installation is also disclosed for converting hydraulic energy into mechanical or electrical energy, the rotating part being configured for rotation about an axis of rotation when a flow of water passes through it, and includes: blades distributed about an axis of rotation and extending from a leading edge to a trailing edge, wherein each blade of the rotating part comprises: a first part defining the leading edge; and a second part formed by an extension which is attached to an attachment region of the first part and which defines the trailing edge of the blade.

BRIEF DESCRIPTION OF THE DRAWINGS

Features of the invention will be better understood and other advantages thereof will appear more clearly in light of the following purely exemplary description of an embodiments of methods for manufacturing a rotating part belonging to a hydraulic machine in accordance with the principles disclosed herein, with reference to the appended drawings in which:

FIG. 5 is an enlarged view of the box V from FIG. 4;

FIG. 7 is an enlarged partial section along line VII-VII in FIG. 6; and

FIG. 8 is a view similar to FIG. 5 of the cross section of a blade belonging to a known runner.

DETAILED DESCRIPTION

Figure 1:
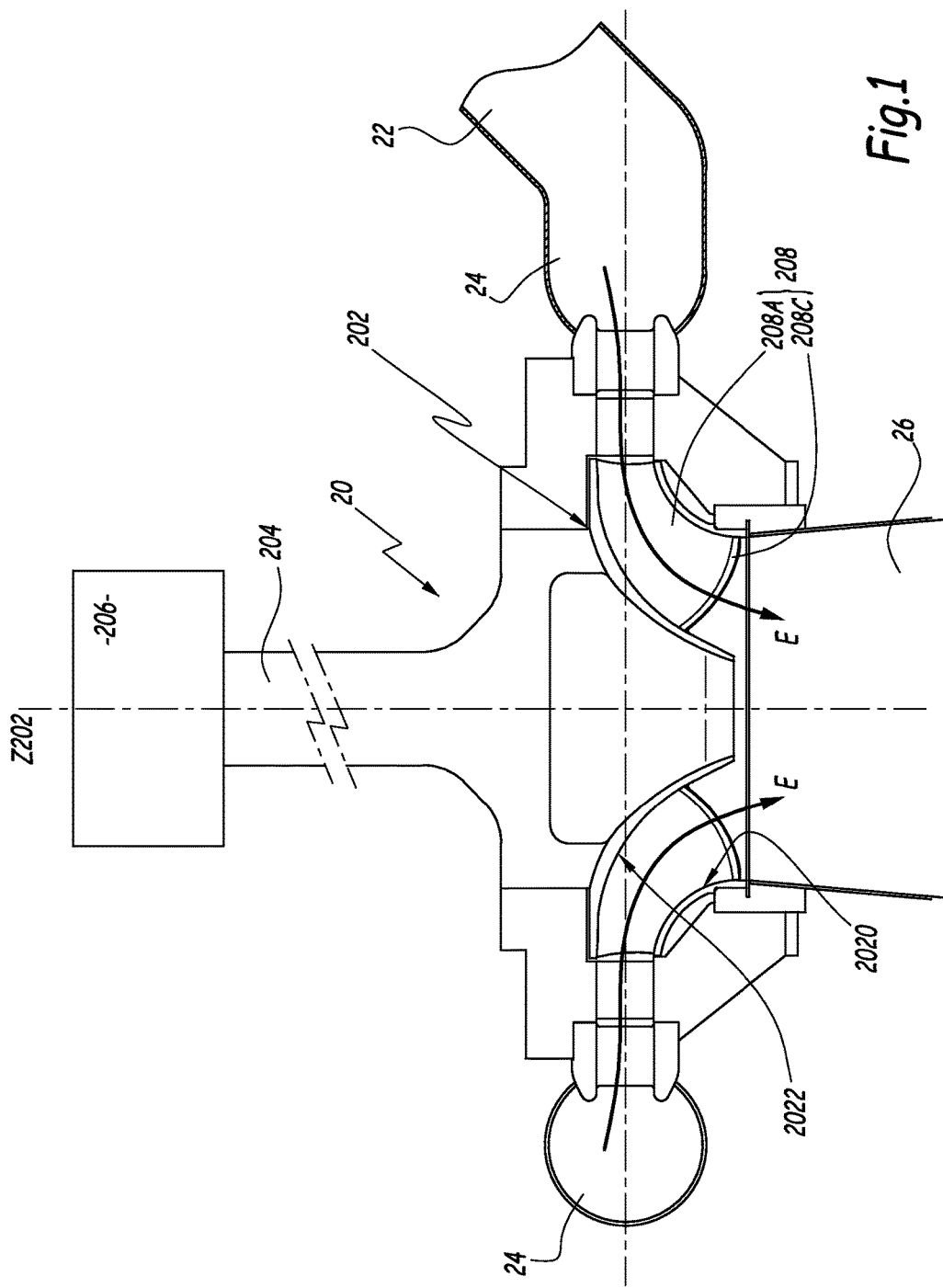
FIG. 1 is a schematic axial section of an energy conversion installation in accordance with an exemplary embodiment, incorporating a Francis turbine as disclosed herein.

Disclosed herein is a method for manufacturing a rotating part of a hydraulic machine, by which it is possible to manufacture a hydraulic machine which is more robust and has improved performance.

To that end, a method is disclosed for manufacturing a rotating part belonging to a hydraulic machine of an installation for converting hydraulic energy into electrical or mechanical energy, this rotating part including blades distributed about an axis of rotation of the rotating part and extending from a leading edge to a trailing edge. In accordance with exemplary embodiments, this method comprises:

a) manufacturing, in steel, a first part of each blade, which defines the leading edge thereof, b) manufacturing a second part of the blade in a material other than steel and attaching this to the first part of the blade so as to form a trailing edge.

Using a two-part blade, the second part of which is made of a material other than steel, makes it possible to reduce the thickness of the trailing edge to a near-zero thickness without impairing either the mechanical strength of the runner or the lifespan of the equipment, which means that the Kármán vortex streets which appear at the trailing edge of the blades are reduced.

According to one advantageous but non-compulsory aspect, the second part is attached to the first part by adhesive bonding, welding or screwing.

A rotating part belonging to a hydraulic machine of an installation for converting hydraulic energy into mechanical or electrical energy is also disclosed, this rotating part being in rotation about an axis of rotation when a flow of water passes through it, and including blades distributed about the axis of rotation and extending from a leading edge to a trailing edge. In accordance with exemplary embodiments, each blade of the rotating part can include a first part defining the leading edge and a second part formed by an extension which is attached to an attachment region of the first part and which defines the trailing edge of the blade.

According to advantageous but non-compulsory aspects disclosed herein, a rotating part belonging to a hydraulic machine may include one or more of the following features, in any technically permissible combination:
- The extension includes two surfaces which, respectively, extend a pressure face and a suction face which are defined by the first part of the blade.
- The extension is made of a material whose elastic limit is above that of steel, whose crack propagation tendency is lower than that of steel or whose modulus of elasticity is lower than that of steel, such as a composite material.
- The extension extends the blade and has a length, considered between the trailing edge and the attachment region, of between 1% and 25%, for example, equal to 10% of the average total length of the blade.
- The rotating part is a Francis-type runner having a runner crown and a runner band between which extend the blades, the first part and the second part being attached to the runner crown and to the runner band.
- The extension has a cross section in the shape of a symmetric point.
- The rotating part belongs to a machine of the bulb, Kaplan, propeller or Deriaz type and includes a hub, which rotates about an axis when in operation, and blades which extend radially, with respect to the axis of rotation, from the hub.

A hydraulic machine is disclosed which includes a rotating part as defined herein.

An installation for converting hydraulic energy into mechanical or electrical energy is also disclosed, which includes a hydraulic machine as defined herein.

FIG. 1 shows an energy conversion installation 2 in accordance with the exemplary embodiments. This energy conversion installation 2 includes a hydraulic machine 20 which, in the example, is a Francis turbine. The rotating part of the turbine 20 is therefore a Francis-type runner 202. This runner 202 rotates about a vertical axis Z202 and turns a drive shaft 204. In the present case, the drive shaft 204 is connected to an alternator 206 in order to produce electricity. However, it is also possible to use the mechanical energy produced to drive another device. The water is stored upstream in a water reservoir (not shown). It is then supplied to the hydraulic turbine 20 via the intermediary of a penstock 22 with a head which is defined by the height difference between the water reservoir and the turbine 20. The penstock 22 opens into a casing 24 which surrounds the runner 202 and by means of which the water can be distributed, substantially regularly about the axis Z202, inside the runner 202.

More precisely, the water flows between blades 208 which are positioned between a runner crown 2022 and a runner band 2020 of the runner 202. These blades 208 can each include a leading edge 2080, against which the water arrives from the casing 24, and a trailing edge 2082, from which the water leaves toward a draft tube 26. The blades 208 have an asymmetric profile, with a pressure face 2084 and a suction face 2086. A chord 2088 is defined as a line which is equidistant between the pressure face 2084 and the suction face 2086 and which passes through the leading edge 2080 and the trailing edge 2082. The flow direction of the water through the turbine 20 is shown in FIG. 1 by arrows E.

Figure 2:
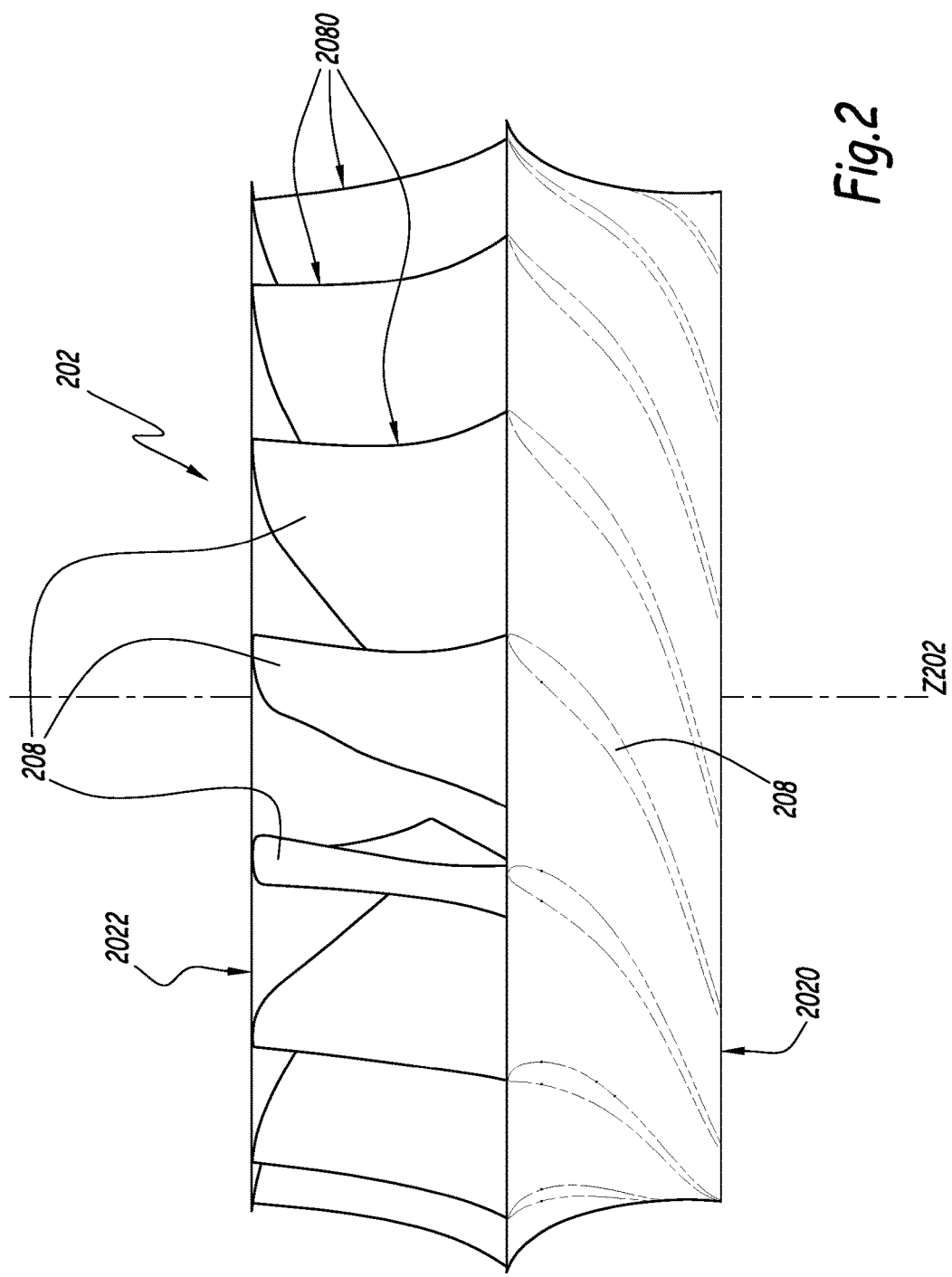
FIG. 2 is a side view of a runner of the turbine of FIG. 1.

FIG. 2 shows the runner 202 in accordance with an exemplary embodiment. Of interest is, more precisely, the moment at which the flow E reaches the trailing edge 2082 of the blades 208 as it is a particularly critical region for the flow E. Indeed, this moment marks the separation of the flow E from with the blades 208. For that reason, it is the blades 208 which are the subject matter of the manufacturing method.

FIG. 8 shows a trailing edge 2082' of a blade 208' belonging to a runner of the prior art. In this case, the blade has an asymmetric shape close to the trailing edge 2082' as the thickness decreases toward this edge. A trailing edge of reduced thickness is thus obtained. However, the trailing edge 2082' still retains a certain thickness as the properties of steel are not such that the required lifespan can be guaranteed when the thickness is too small, with in particular a risk of cracking.

Of interest in the following is the interface between the trailing edge 2082 of a blade 208 of the runner 202 in accordance with the invention and the flow E. This can also be applied to the other blades 208 of the runner 202.

Figure 3:
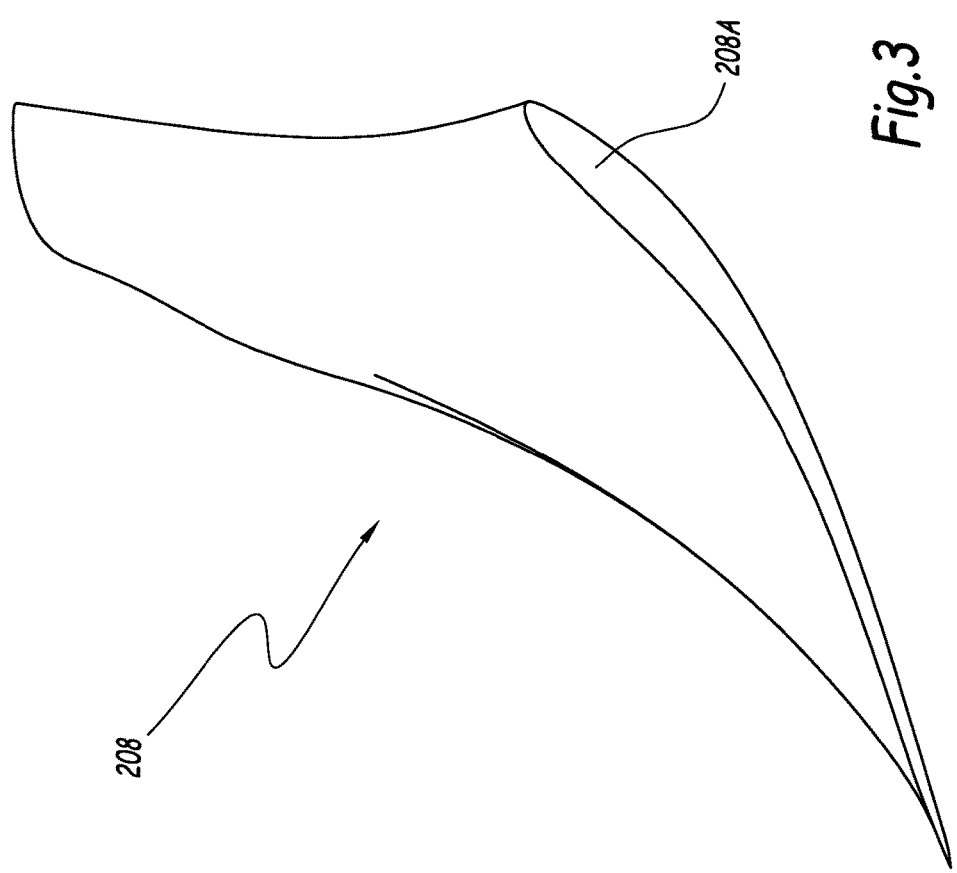
FIG. 3 is a detail view of a single blade belonging to the runner of FIG. 2, specifically the fifth blade from the left as seen in that figure.
Figure 4:
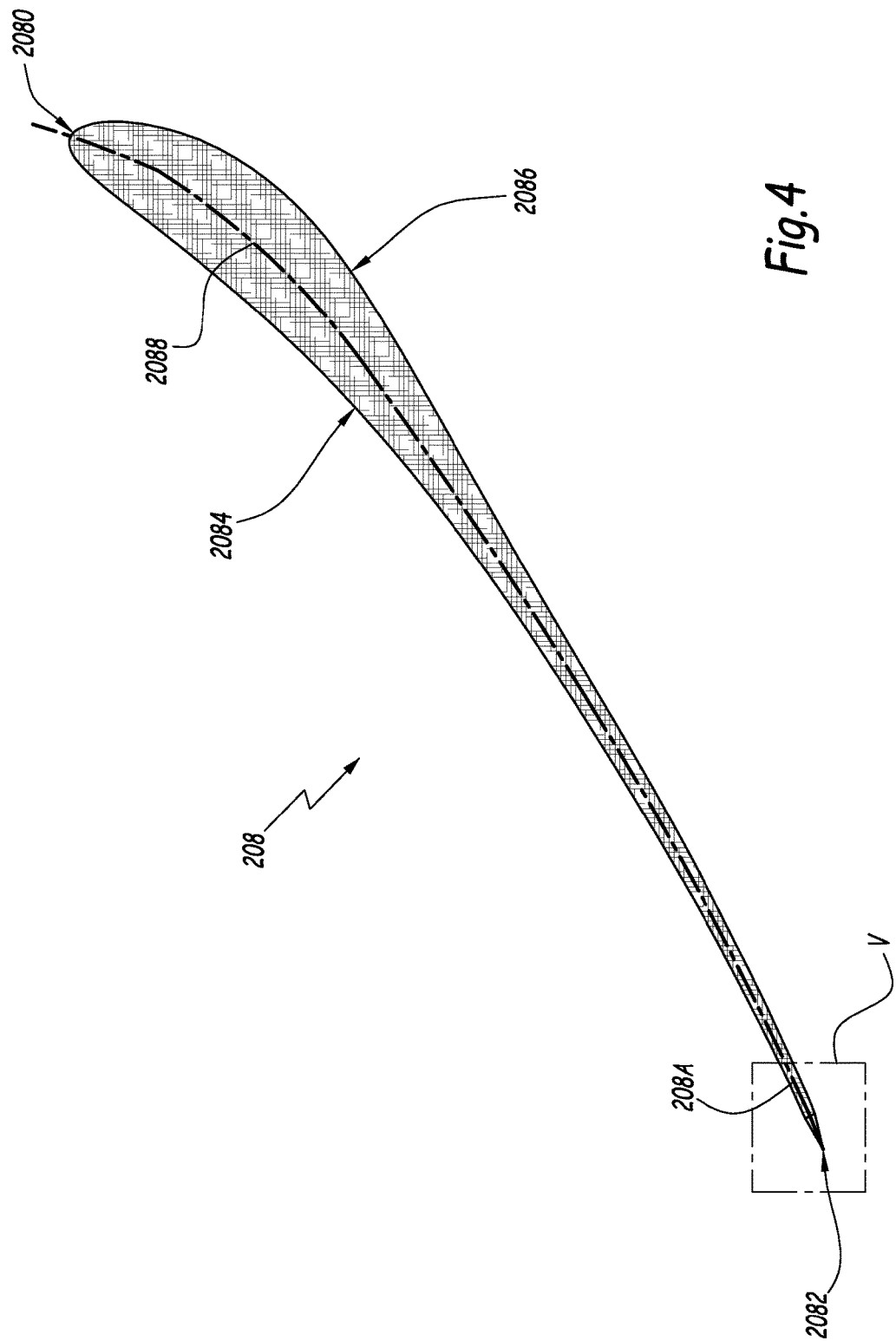
FIG. 4 is a cross section of the blade from FIG. 3.

FIGS. 3 to 5 show a blade 208 manufactured by means of the method of the invention. As shown in FIG. 5, the blade 208 includes a first part 208A, made of steel and manufactured in a first phase of the manufacturing method, and a second part 208C, which is an extension attached to an attachment region 208A2 of the first part 208A and which is made of a flexible material such as a composite material. The attachment region 208A2 is perpendicular to the chord 2088. The extension 208C has a cross section, in a plane similar to that of FIGS. 3 to 5, whose thickness decreases progressively so as to terminate in the shape of a point which is symmetric and defines a linear or quasi-linear trailing edge 2082. In this manner, the Kármán vortex streets are substantially reduced upon leaving the blade 208 and the flow leaving the blades is more stable.

The Kármán vortex streets represent a dynamic load on the blades 208. Thus, the risk of vibration which can lead to cracks is substantially reduced when the rotating part 202 is manufactured according to this method and the lifespan of the machine is thereby increased.

The extension 208C is then adhesively bonded to the attachment region 208A2. During this operation, the extension 208C is deformed so as to follow the curved shape of the attachment region 208A2. This deformation is relatively simple for the fitter as the material used to manufacture the extension 208C is flexible. The extension 208C can be attached to the runner crown 2022 and to the runner band 2020. Alternatively, it can be decoupled from these elements.

That surface of the extension 208C which is on the side of the pressure face 2084 of the blade is labeled S208C4 and that surface of the extension 208C which is on the side of the suction face 2086 of the blade 208 is labeled S208C6. The surfaces S208C4 and S208C6 respectively extend from the pressure face 2084 and from the suction face 2086 and converge toward the trailing edge 2082. In this manner, the flow is not disturbed between the first part 208A and the second part 208C.

The extension 208C extends over the entire surface of the attachment region 208A2. In other words, the part 208C forms the entire trailing edge 2082.

In practice, the extension 208C has a length L208C which, considered perpendicularly to the attachment region 208A2 and between that region and the trailing edge 2082, is between 1% and 25%, for example, equal to 10%, of the length of the chord 2088 between the leading edge 2080 and the trailing edge 2082.

Figure 6:
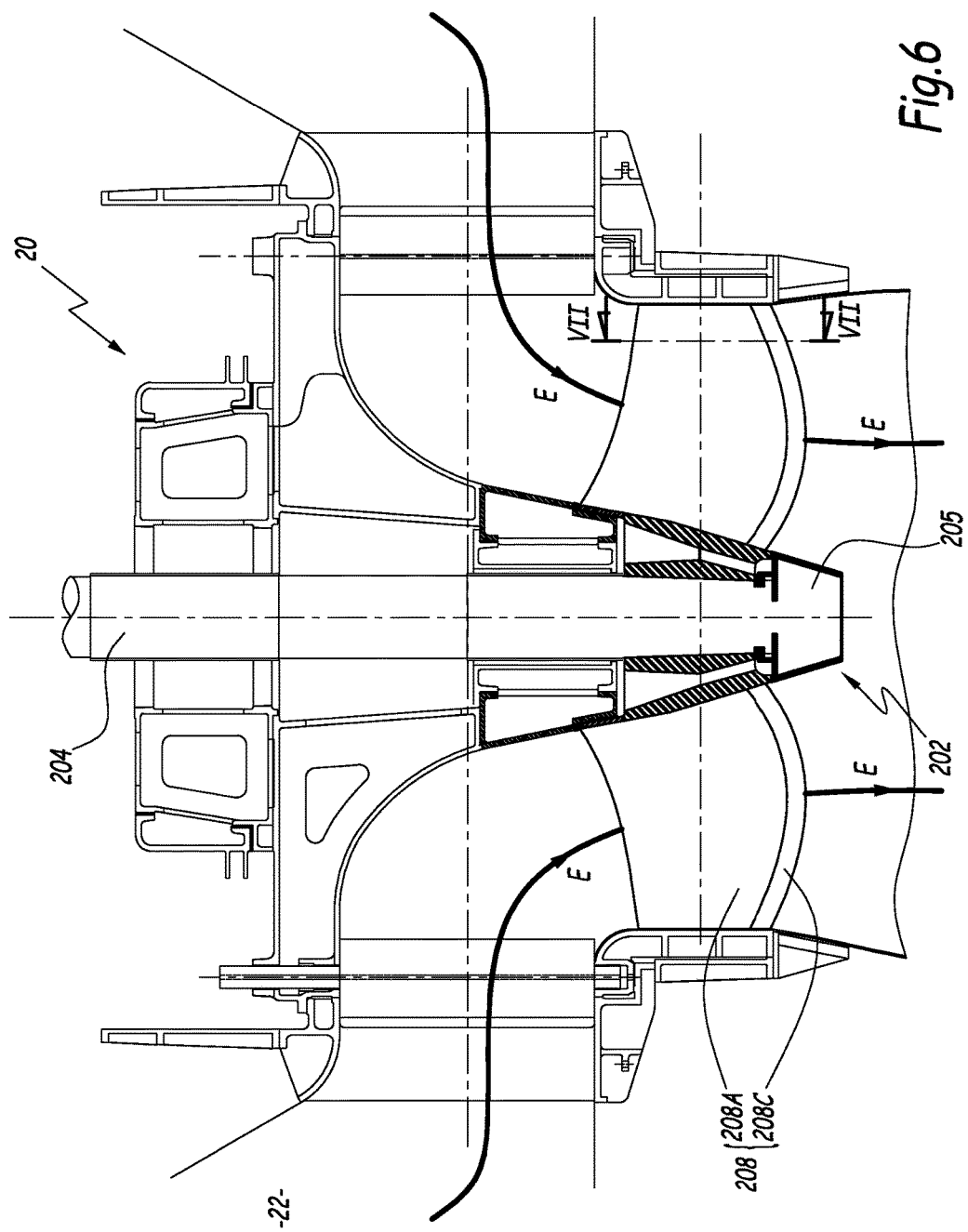
FIG. 6 is a schematic axial section of an installation in accordance with an exemplary embodiment, incorporating a propeller-type turbine in accordance with a second exemplary embodiment.

FIGS. 6 and 7 show another type of hydraulic machine to which a second exemplary embodiment applies. This hydraulic machine is a propeller-type turbine. It includes a hub 205 mounted on a shaft 204 rotating about a vertical axis of rotation Z204. Blades 208 are positioned around the hub 205. This propeller-type turbine is supplied with water by means of a penstock 22. The water thus flows between the blades 208 of the propeller. This flow is represented in FIG. 6 by arrows E. The hub 205 and the blades 208 together define the rotating part 202 of the turbine.

In accordance with exemplary embodiments, the blades 208 of this propeller turbine are made in two parts. A first part 208A defines the leading edge 2080 of each blade as seen by the flow E. An extension 208C is attached to this first part 208A and forms the second part of the blade 208. This extension 208C is manufactured separately from the first part 208A before it is mounted on the part 208A. It is made of composite material. As shown in FIG. 7, the extension 208C has a cross section in the shape of a point defining a linear trailing edge 2082. It is thereby possible to reduce the Kármán vortex streets which impair the efficiency of the turbine 20.

FIG. 7 shows, in greater detail, the trailing edge 2082 of a blade 208. As shown in this figure, the extension 208C is adhesively bonded to an attachment region 208A2 of the first part 208A. Moreover, the extension 208C includes two surfaces S208C4 and S208C6 which, respectively, extend the pressure face 2084 and the suction face 2086 of the blade 208. The flow is therefore not disturbed between the first part 208A and the second part 208C.

In an exemplary variant, features disclosed herein are turbines of a type other than Francis or propeller turbines, such that Kaplan-, bulb- or Deriaz-type turbines.

In an exemplary variant and whatever the embodiment, the extension 208C is screwed or welded to the region 208A2 of the existing blade.

In an exemplary variant which is applicable to all the embodiments, the extension 208C is made of a material whose elastic limit is above that of steel, whose crack propagation tendency is lower than that of steel or whose modulus of elasticity is lower than that of steel, for example, of a composite material or any other appropriate material.

The variants and embodiments mentioned hereinabove may be combined to yield new embodiments encompassed by the present disclosure.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for manufacturing a rotating part belonging to a hydraulic machine of an installation for converting hydraulic energy into electrical or mechanical energy, this rotating part having blades distributed about an axis of rotation of the rotating part and extending from a leading edge to a trailing edge, wherein the method comprises:
   manufacturing, in steel, a first part of each blade, which defines a leading edge thereof; and
   manufacturing a second part of the blade in a material other than steel and attaching this to the first part of the blade so as to form a trailing edge,
   wherein the second part of the blade has a cross section that terminates in the shape of a symmetric point,
   wherein the second part is made of a material whose elastic limit is above that of steel, whose crack propagation tendency is lower than that of steel, or whose modulus of elasticity is lower than that of steel,
   wherein each blade has an asymmetric cross section.

2. The method as claimed in claim 1, wherein the second part is attached to the first part by adhesive bonding, welding or screwing.

3. A rotating part configured for a hydraulic machine of an installation for converting hydraulic energy into mechanical or electrical energy, the rotating part being configured for rotation about an axis of rotation when a flow of water passes through the rotating part, and comprising:
   blades distributed about an axis of rotation and extending from a leading edge to a trailing edge, wherein each blade of the rotating part includes:
   a first part defining the leading edge; and
   a second part formed by an extension which is attached to an attachment region of the first part and which defines the trailing edge of the blade,
   wherein the extension has a cross section in the shape of a symmetric point,
   wherein the extension is made of a material whose elastic limit is above that of steel, whose crack propagation tendency is lower than that of steel or whose modulus of elasticity is lower than that of steel, and
   wherein each blade has an asymmetric cross section.

4. The rotating part as claimed in claim 3, wherein the extension comprises:
   two surfaces which, respectively, extend a pressure face and a suction face which are defined by the first part of the blade.

5. A hydraulic machine, which comprises:
   a rotating part in accordance with claim 3.

6. An installation for converting hydraulic energy into mechanical or electrical energy, which comprises:
   a hydraulic machine as claimed in claim 5.

7. The rotating part as claimed in claim 1, wherein the extension extends the blade and has a length, considered between the trailing edge and the attachment region, of between 1% and 25% of the average total length of the blade.

8. The rotating part as claimed in claim 3, wherein the extension extends the blade and has a length, considered between the trailing edge and the attachment region, equal to 10% of the average total length of the blade.

9. The rotating part as claimed in claim 3, which is a Francis-type runner comprising:
   a runner crown and a runner band between which extend the blades, the first part and the second part being attached to the runner crown and to the runner band.

10. The rotating part as claimed in claim 3, which belongs to a machine of bulb, Kaplan, propeller or Deriaz type and comprises:
    a hub, which rotates about an axis when in operation, and blades which extend radially, with respect to the axis of rotation, from the hub.

11. A hydraulic machine, which comprises:
    a rotating part in accordance with claim 10.

12. An installation for converting hydraulic energy into mechanical or electrical energy, which comprises:
    a hydraulic machine as claimed in claim 11.

\* \* \* \* \*